US012668708B2

(12) United States Patent
Jermy et al.

(10) Patent No.: US 12,668,708 B2
(45) Date of Patent: *Jun. 30, 2026

(54) METHOD FOR MAKING A COATED STAINLESS STEEL IMPLANT

(71) Applicant: Imam Abdulrahman Bin Faisal University, Dammam (SA)

(72) Inventors: B. Rabindran Jermy, Dammam (SA); Vijaya Ravinayagam, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/279,536

(22) Filed: Jul. 24, 2025

(65) Prior Publication Data

US 2026/0049222 A1 Feb. 19, 2026

Related U.S. Application Data

(63) Continuation of application No. 18/808,308, filed on Aug. 19, 2024, now Pat. No. 12,473,438, which is a
(Continued)

(51) Int. Cl.
*C09D 7/40* (2018.01)
*C09D 1/00* (2006.01)
(Continued)

(52) U.S. Cl.
CPC ................ *C09D 7/67* (2018.01); *C09D 1/00* (2013.01); *C09D 5/084* (2013.01); *C09D 5/14* (2013.01);
(Continued)

(58) Field of Classification Search
CPC . C09D 5/14; C09D 5/084; C09D 7/67; C09D 7/61; C09D 7/68; C09D 7/63; C23C 18/1212; C23C 18/1241
See application file for complete search history.

(56) References Cited

U.S. PATENT DOCUMENTS 12,110,419 B2 10/2024 Jermy
12,473,438 B2 * 11/2025 Jermy ...................... C09D 1/00
(Continued)

FOREIGN PATENT DOCUMENTS

CN 109486267 A 3/2019
EP 2 268 327 B1 5/2019
(Continued)

OTHER PUBLICATIONS

Meinerta, et al. ; Corrosion and leaching of silver doped ceramic IBAD coatings on SS 316L under simulated physiological conditions ; Surface and Coatings Technology, vol. 103-104 ; pp. 58-65 ; May 1998 ; 7 Pages.
(Continued)

*Primary Examiner* — Nathan H Empie
(74) *Attorney, Agent, or Firm* — Oblon, McClelland, Maier & Neustadt, L.L.P.

(57) ABSTRACT

A method of making a silver-silicalite coating on a surface of a stainless-steel substrate is provided. The method includes mixing metakaolin with an aqueous solution of NaOH to form a first mixture. The method further includes mixing silica gel and silver nitrate with the first mixture to form a second mixture. Furthermore, the method includes mixing Zeolites Socony Mobil-5 (ZSM-5) with the second mixture to form a third mixture. The method further includes hydrothermally treating the stainless-steel substrate with the third mixture to form the silver-silicalite coating on the surface of the stainless-steel substrate. The hydrothermal treatment is carried out in the absence of an organic template. The stainless-steel substrate coated with the silver-silicalite coating, prepared by the method of the present disclosure, has lower corrosion in comparison to the same stainless-steel substrate without the silver-silicalite coating.

16 Claims, 17 Drawing Sheets

50

52 — Mix metakaolin with an aqueous solution of NaOH to form a first mixture

54 — Mix silica gel and silver nitrate with the first mixture to form a second mixture 56 — Mix Zeolites Socony Mobil-5 (ZSM-5) with the second mixture to form a third mixture 58 — Hydrothermally treat a stainless-steel substrate with the third mixture to form a silver-silicalite coating on a surface of the stainless-steel substrate

Related U.S. Application Data continuation of application No. 17/962,071, filed on Oct. 7, 2022, now Pat. No. 12,110,419.

(51) Int. Cl.

| | |
|---|---|
| *C09D 5/08* | (2006.01) |
| *C09D 5/14* | (2006.01) |
| *C09D 7/61* | (2018.01) |
| *C09D 7/63* | (2018.01) |
| *C09D 171/02* | (2006.01) |
| *C23C 18/12* | (2006.01) |

(52) U.S. Cl.
CPC ................. *C09D 7/61* (2018.01); *C09D 7/63* (2018.01); *C09D 7/68* (2018.01); *C09D 171/02* (2013.01); *C23C 18/1212* (2013.01); *C23C 18/1241* (2013.01); *C23C 18/127* (2013.01)

(56) References Cited

U.S. PATENT DOCUMENTS

| | | | |
|---|---|---|---|
| 2011/0129925 A1* | 6/2011 | Yan | A61L 27/042 435/402 |
| 2011/0244016 A1 | 10/2011 | Gratz et al. | |
| 2019/0168197 A1 | 6/2019 | Corma Can Os | |

FOREIGN PATENT DOCUMENTS

| | | |
|---|---|---|
| WO | 2006/023261 A2 | 3/2006 |
| WO | 2020/202614 A1 | 8/2020 |

OTHER PUBLICATIONS

Doubkova, et al. ; Silicalite-1 Layers as a Biocompatible Nano- and Micro-Structured Coating: An In Vitro Study on MG-63 Cells ; MDPI materials, 12 ; Oct. 31, 2019 ; 13 Pages.
Qing, et al. ; Antibacterial effects of silver incorporated zeolite coatings on 3D printed porous stainless steels ; Materials Science and Engineering: C, vol. 108 ; Mar. 2020 ; 18 Pages.
Dutta et al "Zeolite-supported silver as antimicrobial agents" Coordinated Chemistry Reviews 383 (2019) 1-29 (Year: 2019).
Jirka et al "Interaction of human osteoblast-like Saos-2 cells with stainless steel coated by silicalite-1 films" Materials Science and Engineering C 76 (2017) 775-781. (Year: 2017).
Zhang et al "One-pot synthesis of Ag@silicalite-1 using different silver amine complexes and their performance for styrene oxidation-"New J. Chem., 2021, 45, 21293-21298. (Year: 2021).

* cited by examiner

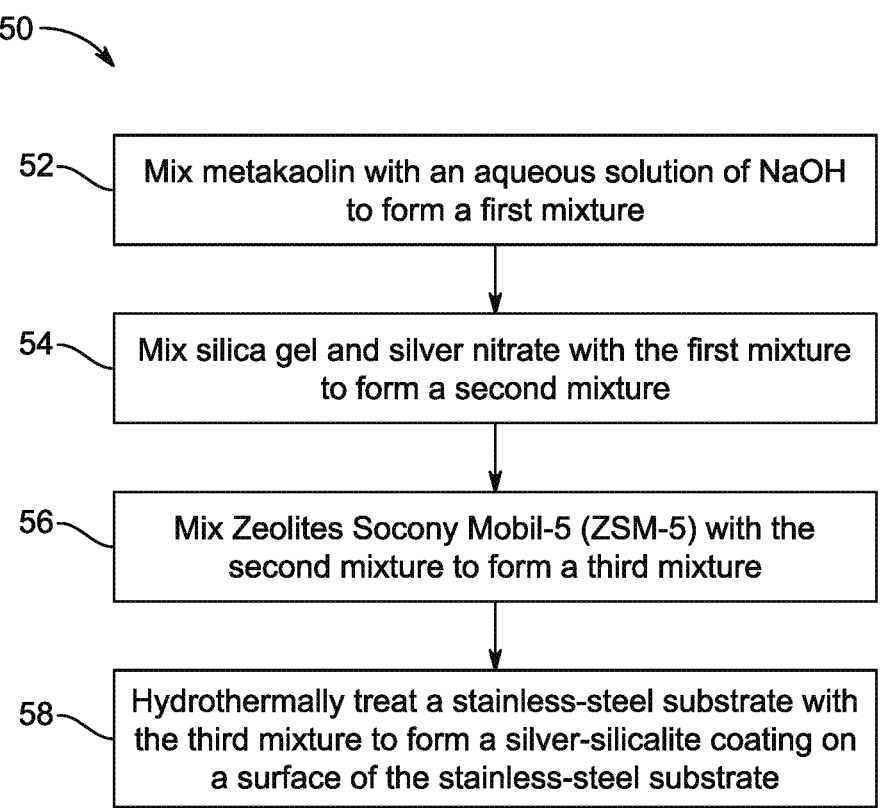

50

52 — Mix metakaolin with an aqueous solution of NaOH to form a first mixture

54 — Mix silica gel and silver nitrate with the first mixture to form a second mixture 56 — Mix Zeolites Socony Mobil-5 (ZSM-5) with the second mixture to form a third mixture 58 — Hydrothermally treat a stainless-steel substrate with the third mixture to form a silver-silicalite coating on a surface of the stainless-steel substrate

FIG. 1

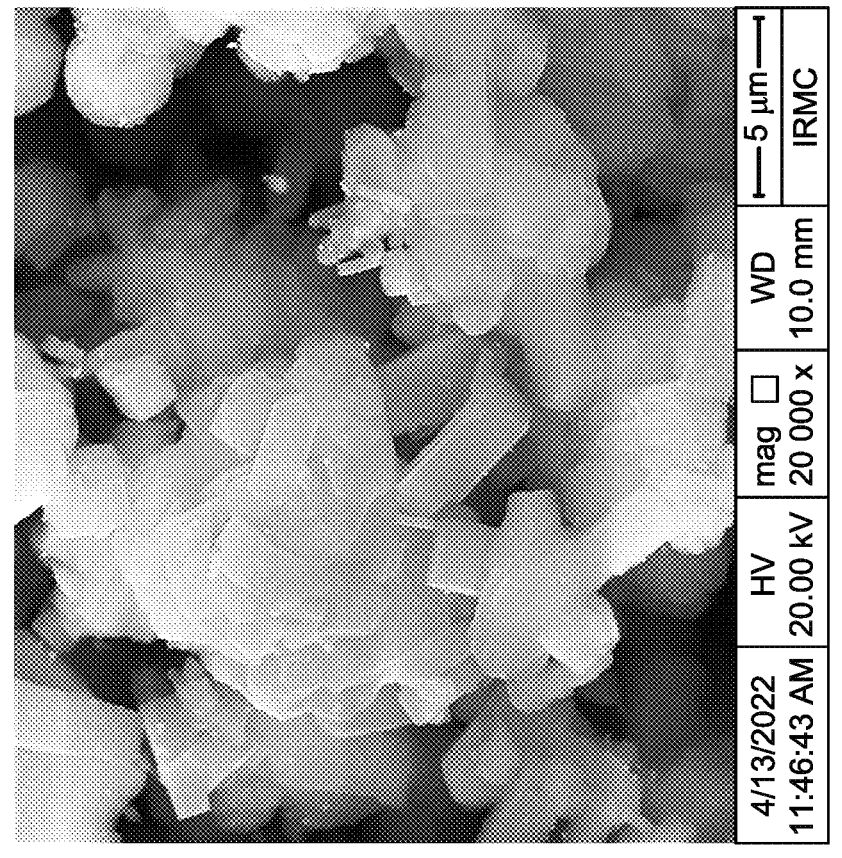
| 4/13/2022 11:46:43 AM | HV 20.00 kV | mag ☐ 20 000 x | WD 10.0 mm | ⊢—5 µm—⊣ IRMC |
| --- | --- | --- | --- | --- |
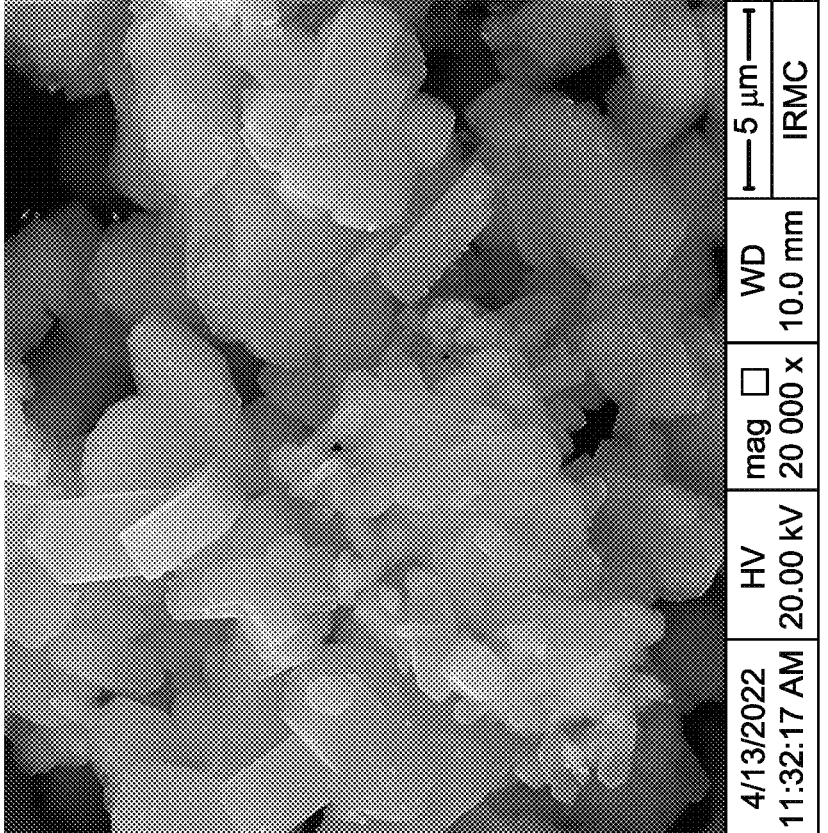
| 4/13/2022 11:32:17 AM | HV 20.00 kV | mag ☐ 20 000 x | WD 10.0 mm | ⊢—5 µm—⊣ IRMC |
| --- | --- | --- | --- | --- |
FIG. 8B

| SEM MAG: 10.0 kx | WD: 11.75 mm | | VEGA3 TESCAN |
|---|---|---|---|
| View field: 13.8 μm | Det: SE | 2 μm | |
| Date(m/d/y): 07/13/21 | SEM HV: 20.0 kV | | Performance in nanospace |

| SEM MAG: 5.00 kx | WD: 11.75 mm | | VEGA3 TESCAN |
|---|---|---|---|
| View field: 27.7 μm | Det: SE | 5 μm | |
| Date(m/d/y): 07/13/21 | SEM HV: 20.0 kV | | Performance in nanospace |

METHOD FOR MAKING A COATED STAINLESS STEEL IMPLANT

CROSS-REFERENCE TO RELATED APPLICATIONS

The present application is a Continuation of U.S. application Ser. No. 18/808,308, now allowed, having a filing date of Aug. 19, 2024 which is a Continuation of U.S. Pat. No. 12,110,419 having a filing date of Oct. 7, 2022.

BACKGROUND

Technical Field

The present disclosure is directed to a silver-silicalite coated substrate suitable for use as an implant, and particularly to a method of making a silver-silicalite coating on a surface of a stainless-steel substrate.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present invention.

Zeolite is a crystalline microporous aluminosilicate material of synthetic or natural origin that is widely used in industrial and biomedical applications for metallic and alloys due to its unique physicochemical properties and potential of being corrosion-resistance, antimicrobial, and environmentally friendly. Zeolite ($SiO_2/Al_2O_3$) is constructed from $AlO_4$ and $SiO_4$ tetrahedra linked to each other by sharing oxygen ions and based on its chemical composite, zeolite provides complex framework types. ZSM-5 (Zeolite Socony Mobil-5) type has a channel size of 5.5 angstrom (Å) and contains silica (Si) to aluminum (Al) ratio of about 25, and it is synthesized using hydrothermal processing from alkaline silicate-aluminate solution as a starting material mixed with organic templates such as tetrapropyl ammonium hydroxide or bromide. Acidic zeolites are widely used as catalysts, and additives for the transformation of complex molecules of crude oil into valuable products fuels, lubricants, and chemicals. However, high silica zeolite with zeolite (MFI) structure is non-acidic and is least utilized. Mostly such non-acidic forms of zeolites are non-toxic and have been used extensively in the gas separation and purification fields.

Implants are medical devices used to support or replace damaged biological structures. Generally, titanium and stainless-steel devices are used as implants in dental and orthopedic industries. Metallic implants may release toxic metal ions (Al, V, Cr, Ni) to surrounding tissues. Generally, titanium alloy releases cytotoxic ion vanadium and aluminum into the surrounding tissues after implantation leading to serious complications such as neurological disorders. The application of a coating may control the release of such ions from the implants by acting as a barrier. Conventionally, surface coating of implants was carried out using hydroxyapatite (HA) and peptide. However, implants coated with HA and peptides are prone to bacterial infections, and result in implants that are brittle in nature and have low mechanical strength. Mismatch in elastic modulus may lead to implant loosening and deosteointegration. Also, high temperatures up to 2000 degrees Celsius (° C.) are generally required for coating HA on titanium and stainless-steel devices.

Accordingly, one object of the present dislosure is to provide a coated substarte suitable for use as an implant, and which substantially reduces or eliminates the aforementioned limitations.

SUMMARY

In an exemplary embodiment, a method of making a silver-silicalite coating on a surface of a stainless-steel substrate is described. The method includes mixing metakaolin with an aqueous solution of NaOH to form a first mixture. The method further includes mixing silica gel and silver nitrate with the first mixture to form a second mixture. Furthermore, the method further includes mixing Zeolites Socony Mobil-5 (ZSM-5) with the second mixture to form a third mixture. The method further includes hydrothermally treating the stainless-steel substrate with the third mixture to form the silver-silicalite coating on the surface of the stainless-steel substrate. The hydrothermal treatment is carried out in the absence of an organic template.

In some embodiments, $SiO_2/Ag$ has a molar ratio of 20:1 to 130:1.

In some embodiments, $SiO_2/Ag$ has a molar ratio of 25:1 to 100:1.

In some embodiments, $SiO_2/Al_2O_3$ has a molar ratio of 30:1 to 100:1.

In some embodiments, $SiO_2/Al_2O_3$ has a molar ratio of 50:1 to 80:1.

In some embodiments, the hydrothermal treatment is carried out at a temperature range of 120 to 220 degrees Celsius (° C.) for 20 to 55 hours.

In some embodiments, the hydrothermal treatment is carried out at a temperature range of 160 to 190° C. for 40 to 50 hours.

In some embodiments, the silver-silicalite coating has a thickness of 0.1 to 5 micrometers (μm).

In some embodiments, the silver-silicalite coating includes silver nanoparticles having an average particle size of 10 to 200 nanometers (nm) diameter.

In some embodiments, the silver-silicalite coating includes rhombohedral crystals of the ZSM-5 decorated with the silver nanoparticles.

In some embodiments, the silver-silicalite coating includes hexagonal lattice crystals of the ZSM-5 decorated with the silver nanoparticles.

In some embodiments, the silver-silicalite coating includes 35 to 45 wt. % 0, 0.5 to 5 wt. % Al, 20 to 35 wt. % Si, 1 to 8 wt. % Cr, 10 to 25 wt. % Fe, 0.5 to 5 wt. % Ni, 0.5 to 5 wt. % Cu, and 1 to 10 wt. % Ag, wherein wt. % is based on a total weight of the silver-silicalite coating.

In some embodiments, the organic template is at least one selected from the group consisting of tetra propyl ammonium hydroxide, tetra propyl ammonium bromide, and isopropyl amine.

In some embodiments, the silver-silicalite coating is at least partially enfolded by a polymer.

In some embodiments, the polymer is at least one selected from the group consisting of polyethylene glycol, poly (ethylenimine), poly (N-isopropyl acrylamide), poly (2-hydroxyethyl methacrylate), dendritic polymers, polysaccharides, poly (glycolic acid), and poly (lactic acid).

In some embodiments, the polymer is polyethylene glycol.

In some embodiments, the silver-silicalite coating includes coffin-shaped particles having an average length in a range of 2 to 5 μm, an average width in a range of 0.5 to 2 μm, and an average height in a range of 0.5 to 2 μm, the coffin-shaped particles agglomerated to form an agglomerate having an average diameter in a range of 4 to 10 μm.

In some embodiments, the silver-silicalite coating has pores having a pore volume of 0.1 to 0.4 centimeter cube per gram ($cm^3/g$).

In some embodiments, the silver-silicalite coating has pores with a pore size distribution of 1 to 5 nm.

In some embodiments, the stainless-steel substrate has a corrosion current from 0.04 to 0.1 ampere per square centimeter ($A/cm^2$) to 0.01 to 0.025 $A/cm^2$ lower in comparison to the same stainless-steel substrate without the silver-silicalite coating.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a schematic flow diagram of a method of making a silver-silicalite coating on a surface of a stainless-steel substrate, according to certain embodiments of the present disclosure;

FIG. 8B shows SEM micrographs of the silver-silicalite before coating on the stainless-steel implant at a magnification of 20,000×, according to certain embodiments of the present disclosure;

DETAILED DESCRIPTION

Figure 2:
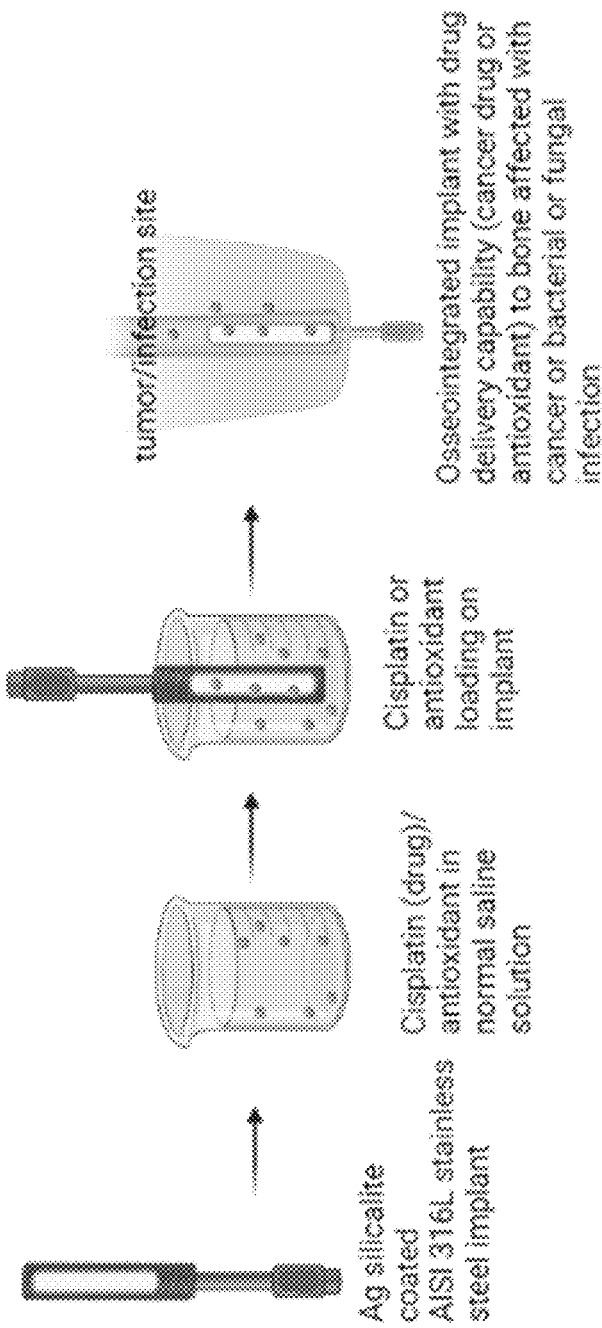
FIG. 2 is a schematic diagram depicting cisplatin functionalized silver silicate, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed towards a cost-effective method of making the silver-silicalite coating, also referred to as the coating. The coating can be applied to surfaces or substrates, such as steel, carbon steel, stainless steel, and any other metallic substrate used or known in the art, that are susceptible to corrosion. Experimental results with the coating on the surfaces or substrates demonstrated a significant increase in anti-corrosion behaviors. In addition, the coating exhibits longer service life, enhanced biocompatibilities, and long-lasting antibacterial properties, thereby circumventing the drawbacks such as high manufacturing cost, and low corrosion resistance properties of the prior art.

FIG. 1 shows a schematic flow diagram of a method 50 of making the silver-silicalite coating on the surface of a stainless-steel substrate. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing metakaolin with an aqueous solution of NaOH to form a first mixture. In an embodiment, the metakaolin may be replaced with any other form aluminum silicate compound known in the art. In an embodiment, the metakaolin is flashed metakaolin. Flashed metakaolin is obtained via flash calcination of powdered clay at a temperature between 600 and 900° C. for a few seconds, followed by fast cooling. In another embodiment, the metakaolin is conventional metakaolin which is obtained by calcination in a rotary furnace for at least 5 hours. The metakaolin, either flashed metakaolin or conventional metakaolin, may be mixed with an alkaline solution such as NaOH to form the first mixture. In an embodiment, any other alkaline solution, such as KOH, C(OH)$_2$, NH$_4$OH, may also be used to form the first mixture. In an embodiment, the metakaolin with the aqueous solution of 0.5-2 molars (M) NaOH, preferably 1 M NaOH, to form a first mixture.

At step 54, the method 50 includes mixing silica gel and silver nitrate with the first mixture to form a second mixture. In an embodiment, any other silver salt, such as silver perchlorate (AgClO$_4$), silver chlorate (AgClO$_3$), silver chloride (AgCl), silver iodide (AgI), silver fluoride (AgF), silver bromide (AgBr), silver acetate (CH$_3$COOAg), etc., may be used instead of silver nitrate. The silica gel and the silver nitrate are allowed to react in a molar ratio of 20:1 to 130:1, and preferably, in a molar ratio of 25:1 to 100:1, and more preferably in a molar ratio of 100:1.

At step 56, the method 50 further includes mixing the ZSM-5 with the second mixture to form a third mixture. In some embodiments, the ZSM-5 may be a ZSM-5-80. In some embodiments, the zeolite may be a ZSM-11. The molar ratio of SiO$_2$:Al$_2$O$_3$ in ZSM-5 is important in making the silver-silicalite coating. In some embodiments, the molar ratio of SiO$_2$:Al$_2$O$_3$ is in a ratio of 30:1 to 100:1, and more preferably in a range of 50:1 to 80:1.

At step 58, the method 50 further includes hydrothermally treating the stainless-steel substrate with the third mixture to form the silver-silicalite coating on the surface of the stainless-steel substrate. In an implementation of the present disclosure, the silver-silicalite coating is applied on a surface of the stainless-steel substrate, also referred to as the stainless-steel implant or just implant. In some embodiments, the silver-silicalite coating may be applied on bismuth, chromium, indium, nickel, rhodium, ruthenium, and vanadium substrates. In an embodiment, the silver-silicalite coating may also be applied to the titanium substrate. Although the description and examples herein described refers to the use of stainless steel as a substrate, it may be understood by a person skilled in the art that aspects of the present disclosure may be applied to other substrates, such as titanium substrates, as well, albeit with a few variations, as may be obvious to a person skilled in the art. In an embodiment, the substrate is ceramic. The hydrothermal treatment is carried out in the absence of an organic template. In some embodiments, the organic template is at least one selected from the group consisting of tetra propyl ammonium hydroxide, tetra propyl ammonium bromide, and isopropyl amine. In an embodiment, the hydrothermal treatment is carried out at a temperature range of 120 to 220 degrees Celsius (° C.) for 20 to 55 hours. In an alternate embodiment, the hydrothermal treatment may be carried out at a temperature range of 150 to 200° C. for 35 to 52 hours. In yet another embodiment, the hydrothermal treatment is carried out at a temperature range of 160 to 190° C. for 40 to 50 hours.

In an embodiment, the stainless-steel substrate has a corrosion current from 0.04 to 0.1 ampere per square centimeter (A/cm$^2$) to 0.01 to 0.025 A/cm$^2$ lower in comparison to the same stainless-steel substrate without the silver-silicalite coating. In an embodiment, the stainless-steel substrate may have a corrosion current from 0.08 to 0.1 A/cm$^2$ to 0.05 to 0.020 A/cm$^2$ lower in comparison to the same stainless-steel substrate without the silver-silicalite coating. As used herein, the term 'corrosion current' refers to the current produced in an electrochemical cell during corrosion.

The silver-silicalite coating prepared by the method of the present disclosure includes different elements such as oxygen (O), aluminum (Al), silicon (Si), chromium (Cr), iron (Fe), nickel (Ni), copper (Cu), and silver (Ag). In an embodiment, the silver-silicalite coating includes 35 to 45 wt. % 0, 0.5 to 5 wt. % Al, 20 to 35 wt. % Si, 1 to 8 wt. % Cr, 10 to 25 wt. % Fe, 0.5 to 5 wt. % Ni, 0.5 to 5 wt. % Cu, and 1 to 10 wt. % Ag, the wt. % is based on the total weight of the silver-silicalite coating. In an alternate embodiment, the silver-silicalite coating may include 38 to 42 wt. % 0, 2.5 to 4.5 wt. % Al, 25 to 30 wt. % Si, 3 to 7 wt. % Cr, 15 to 20 wt. % Fe, 2.5 to 4.5 wt. %

Ni, 1.5 to 4.8 wt. % Cu, and 3 to 9 wt. % Ag, the wt. % is based on the total weight of the silver-silicalite coating.

In an embodiment, the silver-silicalite coating prepared by the method of the present disclosure is at least partially enfolded by a polymer. In another embodiment, the silver-silicalite coating is completely enfolded by the polymer. According to the present disclosure, the polymer may include polyester (such as dacron), polytetrafluoroethylene, polyurethane silicone-based material, and polyamide. The polymer is at least one selected from the group consisting of polyethylene glycol, poly (ethylenimine), poly (N-isopropyl acrylamide), poly (2-hydroxyethyl methacrylate), dendritic polymers, polysaccharides, poly (glycolic acid), and poly (lactic acid). In some embodiments, the polymer is polyethylene glycol.

In an embodiment, the silver-silicalite coating prepared by the method of the present disclosure includes silver nanoparticles having an average particle size of 10 to 200 nanometers (nm) in diameter, and more preferably, have an average particle size of 90 to 150 nm diameter.

In some embodiments, the silver-silicalite coating prepared by the method of the present disclosure includes rhombohedral crystals of Zeolites Socony Mobil-5 (ZSM-5) decorated with the silver nanoparticles. In some embodiments, the silver-silicalite coating includes hexagonal lattice crystals of the ZSM-5 decorated with the silver nanoparticles.

In some embodiments, the silver-silicalite coating prepared by the method of the present disclosure has a thickness of 0.1 to 5 micrometers (μm), preferably a thickness of 0.8 to 4.5 μm.

According to the present disclosure, the silver-silicalite coating includes rhombohedral cuboidal, rhombohedral parallelepiped and/or coffin-shaped (e.g., hexagonal cuboidal and octagonal cuboidal) particles having an average length in a range of 0.5 to 20 μm, preferably 1 to 10 μm or 2 to 5 μm, an average width in a range of 2 to 5 μm, preferably 1 to 2 μm or 0.5 to 1 μm, and an average height in a range of 2 to 5 μm, preferably 1 to 2 μm or 0.5 to 1 μm, the particles may be agglomerated to form an agglomerate having an average diameter in a range of 4 to 20 μm, preferably 6 to 15 μm or 5 to 10 μm. In some embodiments, the particles may have an average length in a range of 3.5 to 4.5 μm, an average width in a range of 1 to 1.5 μm, and an average height in a range of 0.8 to 1.8 μm, the coffin-shaped particles agglomerated to form an agglomerate having an average diameter in a range of 6 to 8 μm.

Hexagonal cuboidal particles preferably have a length of 2 to 10 μm and a longest width that is 0.05× to 0.5× the length, preferably 0.1× to 0.3× the length or about 0.2× the length, and a shortest width that is 0.02× to 0.3× times the length, preferably 0.05× to 0.1× the length or about 0.2× the length.

In an embodiment, the silver-silicalite coating has pores having a pore volume of 0.05 to 0.5 cm³/g, preferably 0.1 to 0.4 or 0.2 to 0.3 cm³/g. In an alternate embodiment, the pores of the silver-silicalite coating may have a pore volume of 0.2 to 0.35 cm³/g. In an embodiment, the silver-silicalite coating has pores with a pore size distribution of 0.5 to 10 nm, preferably 1 to 5 nm 1 or 2 to 4 nm. In an alternate embodiment, the pores of the silver-silicalite coating may include a pore size distribution of 2 to 4.5 nm.

EXAMPLES

The following examples describe and demonstrate exemplary embodiments of method of making the silver-silicalite coating on the surface of the stainless-steel substrate as described herein. The examples are provided solely for the purpose of illustration and are not to be construed as limitations of the present disclosure, as many variations thereof are possible without departing from the spirit and scope of the present disclosure.

Example 1: Silver-Silicalite Coating

A green-synthetic method of synthesizing silver silicalite for use as a coating over implants is described. The coating includes silver and silica in a zeolite structure. Silica degradation yields a non-toxic silicic acid, a source of silicon for the formation of connective tissue. The silver-incorporated silica coating is simple and has no issues related to premature drug release and rapid degradation. Commercial scale production is cheaper with cheap raw materials such as clay, and colloidal silica using green technology. Expensive and environmentally toxic templates required for zeolite synthesis was avoided. The coating can be functionalized with different antibiotics for sustained drug release. Furthermore, the silver-silicalite coating was functionalized with an anticancer drug such as cisplatin for the potential treatment of osteosarcoma as shown in FIG. 2.

The physicochemical characterizations of the coating were achieved by examining the morphology and the chemical nature using X-ray diffraction (XRD). The surface area and the pore size were determined using a surface area analyzer. The antimicrobial activity (as shown in table 1) was quantitatively assessed by measuring the growth of *Candida aurous*.

Example 2: Experimental Section

Figure 3:
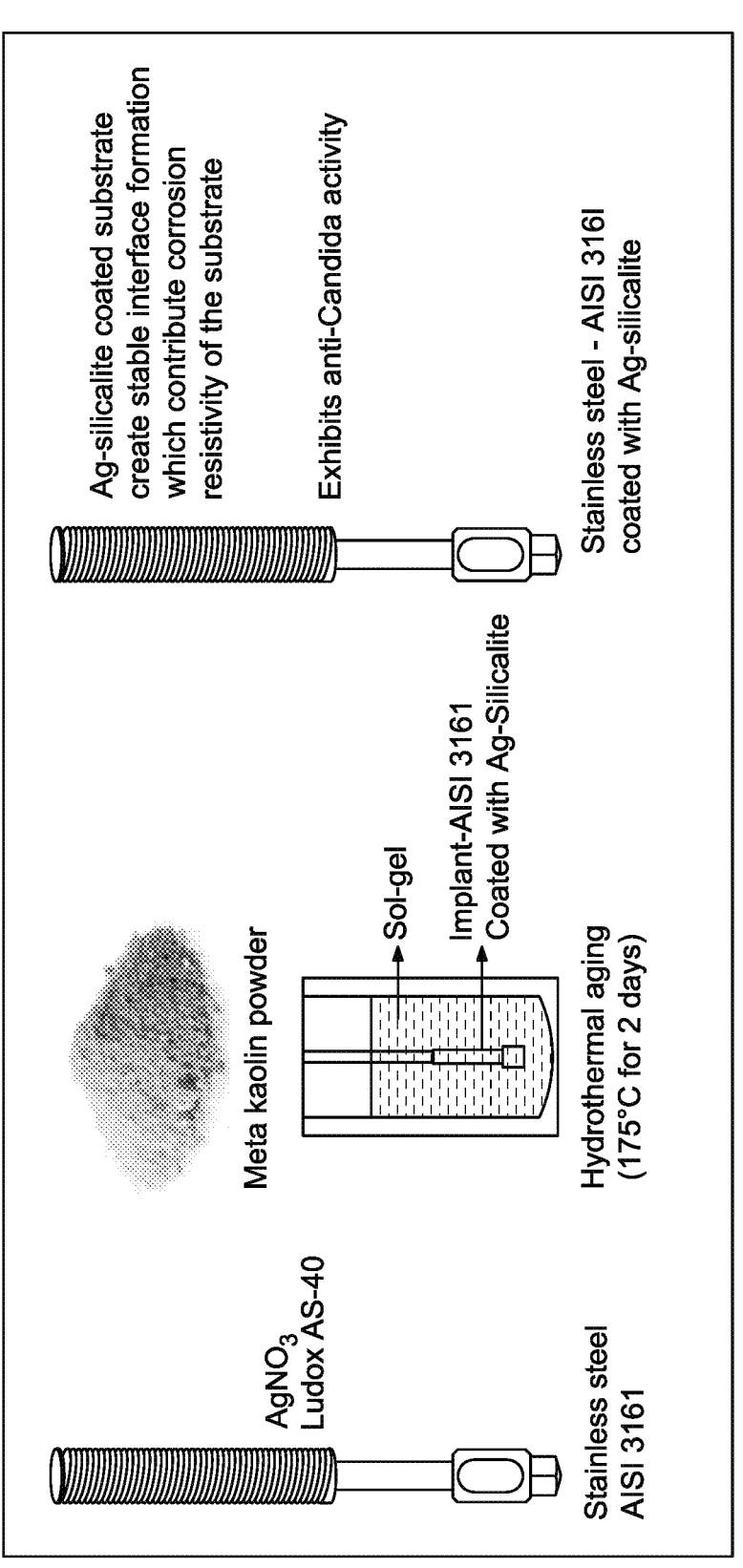
FIG. 3 is a perspective diagram depicting a hydrothermal process of coating the silver silicalite on a stainless-steel implant, according to certain embodiments of the present disclosure.
Figure 4:
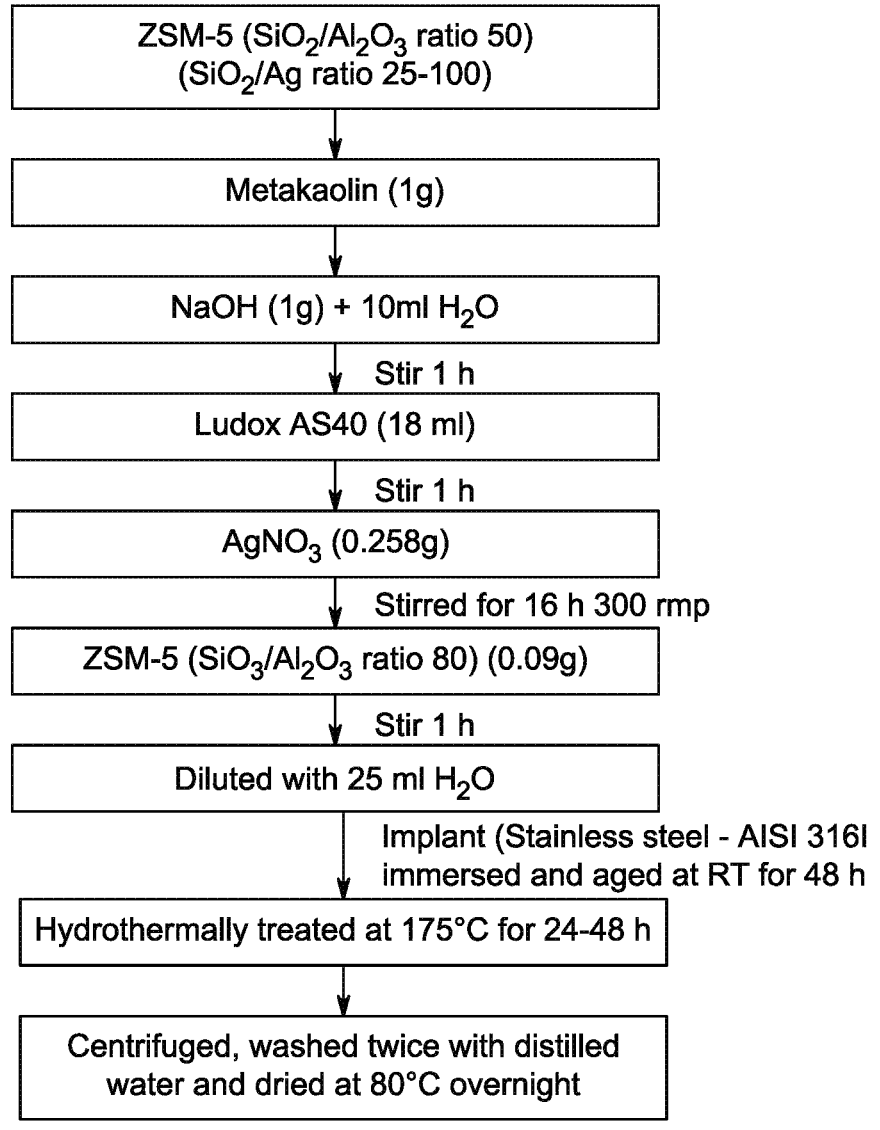
FIG. 4 is a schematic flow diagram depicting a hydrothermal process of coating the silver silicalite on the stainless-steel implant, according to certain embodiments of the present disclosure.

Material and substrate: AISI 316l stainless steel and titanium alloy implants were used. Hereinafter, the stainless steel and titanium alloy implants are collectively referred to as the 'implants' or individually referred to as the 'implant'. Coating solution formulation and deposition of the coating FIG. 3 and FIG. 4 show a perspective diagram and schematic flow diagram of a method of green synthesis and hydrothermal coating process of a stainless-steel implant, respectively. 1.0 gram of metakaolin was taken and stirred for 1 hour along with 10 ml distilled water and 1 g of NaOH to form a first mixture. Then 18 ml (22.83 g) of colloidal silica (Ludox AS40) was added along with 0.258 g of silver nitrate mixed in 10 ml water (Si:Ag molar ratio 100:1) and stirred for 1 hour then 10 ml water was added and stirred for 8-16 hours at 300 rotations per minute (rpm) to form a second mixture. Then 0.09 g of the ZSM-5-80 was added to the second mixture and stirred for 1 hour to obtain the third mixture. The third mixture was diluted with 25 ml of water to form a gel. An implant was placed at the bottom of a reactor and suspended using a silver wire. The implant was made by dipping inside the dilute gel and then aged at room temperature (RT) for 48 hours after immersing, and then hydrothermally aged at 175° C. for 48 hours. Then the stainless-steel implant was removed and washed with distilled water (5 ml twice) and dried at 80° C. overnight. Copolymer and/or polyethylene glycol coating can be performed by calculating the silver-silicalite present in the implant. The recovered sample was centrifuged by washing with 10 ml water (2 times) and dried at RT.

In a preferable embodiment of the invention the hydrothermal treatment is carried out in a plurality of stages at varying pressures and pressurization conditions. Preferably a substrate is immersed in a silica gel/silver particle/zeolite mixture coating composition in a reactor or vessel in which the substrate is suspended then sequentially pressurized and depressurized. Pressurization is preferably to a hydraulic pressure of 3 MpPa, preferably 4 or 5 MPa. Pressurization is preferably carried out without a gaseous headspace. The time to maintain pressure in the immersion solution is 1-10 minutes or about 5 minutes. Preferably the pressure of the reactor or vessel in which hydrothermal treatment is taking place is raised from ambient pressure to treatment pressure over a period of 5-10 minutes. Depressurization is carried out under the same or equivalent conditions to pressurization. Each pressurization cycle is followed by removing the substrate from the immersion solution and draining at ambient pressure. Draining time may vary, for example from 1-15 min, preferably 5-10 minutes. After draining further pressurization cycles are undertaken. Preferably at least 3 pressurization cycles, more preferably at least 5 pressurization cycles and up to 10 pressurization cycles are employed. While not being bound to theory, pressurization and depressurization with the silica gel/silver particle/zeolite mixture coating composition favors formation and disposition of silver crystals at the outer surface of the silver-silicalite coating such that silver particles are biased to the outermost portion of the coating. Preferably no silver crystals are in direct physical contact with the substrate surface whereas the exterior surface of the silver-silicalite coating may have a substantial surface area, e.g., a major portion of the exterior surface area, representing exposed silver crystal surfaces.

Results and Discussions

Figure 5:
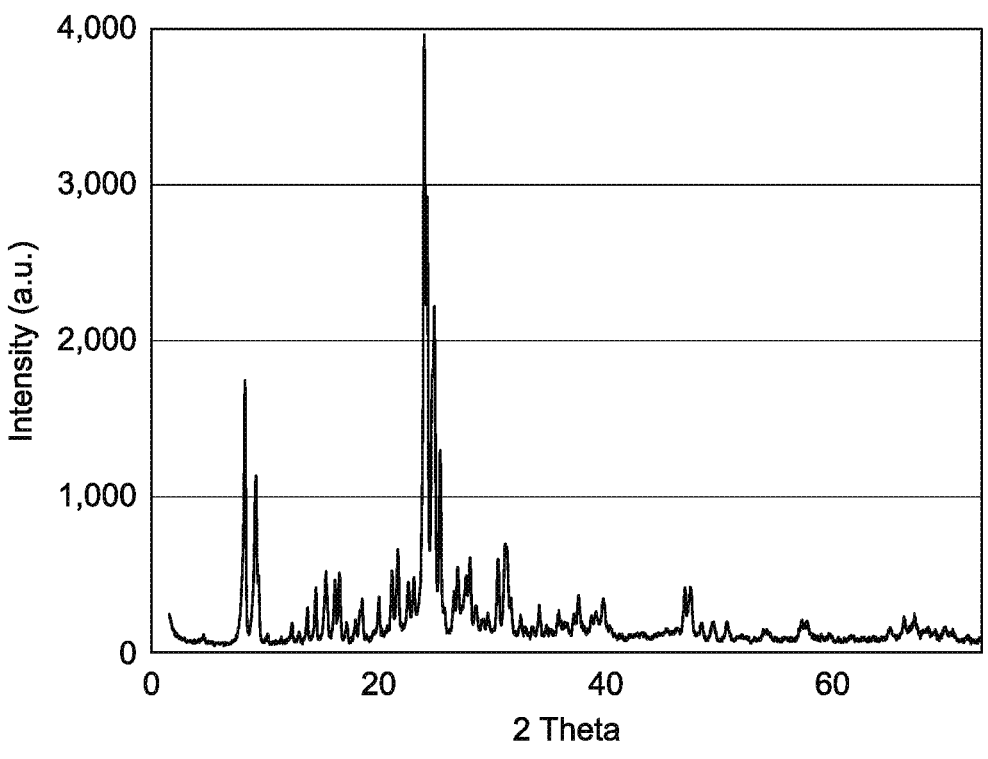
FIG. 5 is an X-ray diffraction (XRD) pattern of the silver-silicalite coating synthesized by the method of the present disclosure, according to certain embodiments of the present disclosure.
Figure 6:
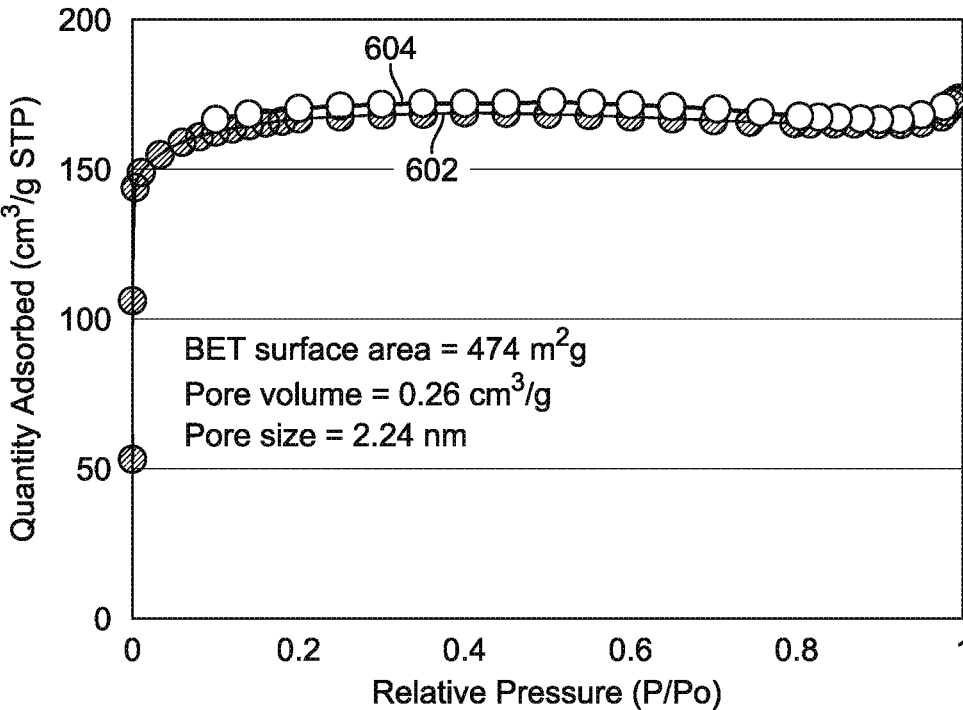
FIG. 6 is a Brunauer-Emmett-Teller (BET) plot of the silver-silicalite coating synthesized through the method of present disclosure, according to certain embodiments of the present disclosure.
Figure 7:
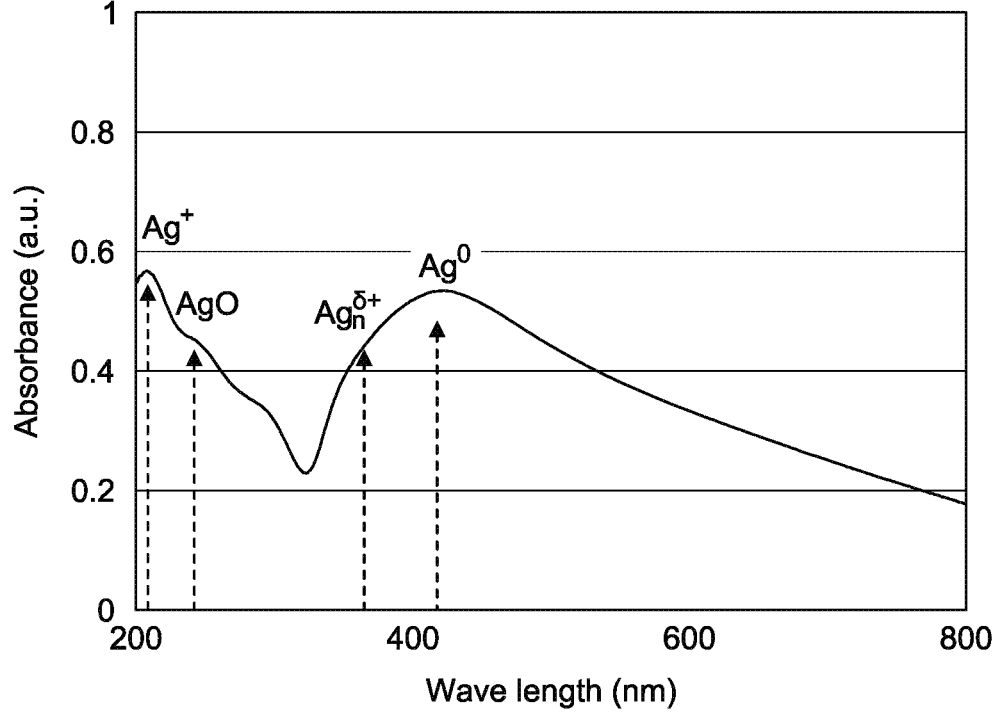
FIG. 7 is a graph depicting diffuse reflectance spectroscopy (DRS) of the silver-silicalite coating synthesized through the method of present disclosure, according to certain embodiments of the present disclosure.

FIG. 5 shows an XRD pattern of the silver-silicalite synthesized through the method of the present disclosure. The XRD pattern shows a typical pattern to that of high silica zeolite. The presence of crystalline Mobil-type five (MFI) structure clearly shows the formation of the ZSM-5 structure. The specific surface area was measured using the nitrogen adsorption technique; the results of this study are shown in FIG. 6 which includes the adsorption (602) and desorption (604) curves of the silver-silicalite. The sample exhibited a high surface area of about 474 meters square per gram (m²/g), pore volume of 0.26 cm³/g and pore size distribution of 2.24 nm. The presence of micropore was evident with steep condensation at p/po value below 0.1. The coordination environment of Ag over silicalite was studied using diffuse reflectance spectroscopy (DRS) as shown in FIG. 7. The presence of different Ag species such as $Ag^+$, AgO, $Ag_n^{\delta+}$ and $Ag^0$ was visible with distinct peaks at about 212 nm, 250 nm, 360 nm, and 425 nm, respectively.

Figure 8A:
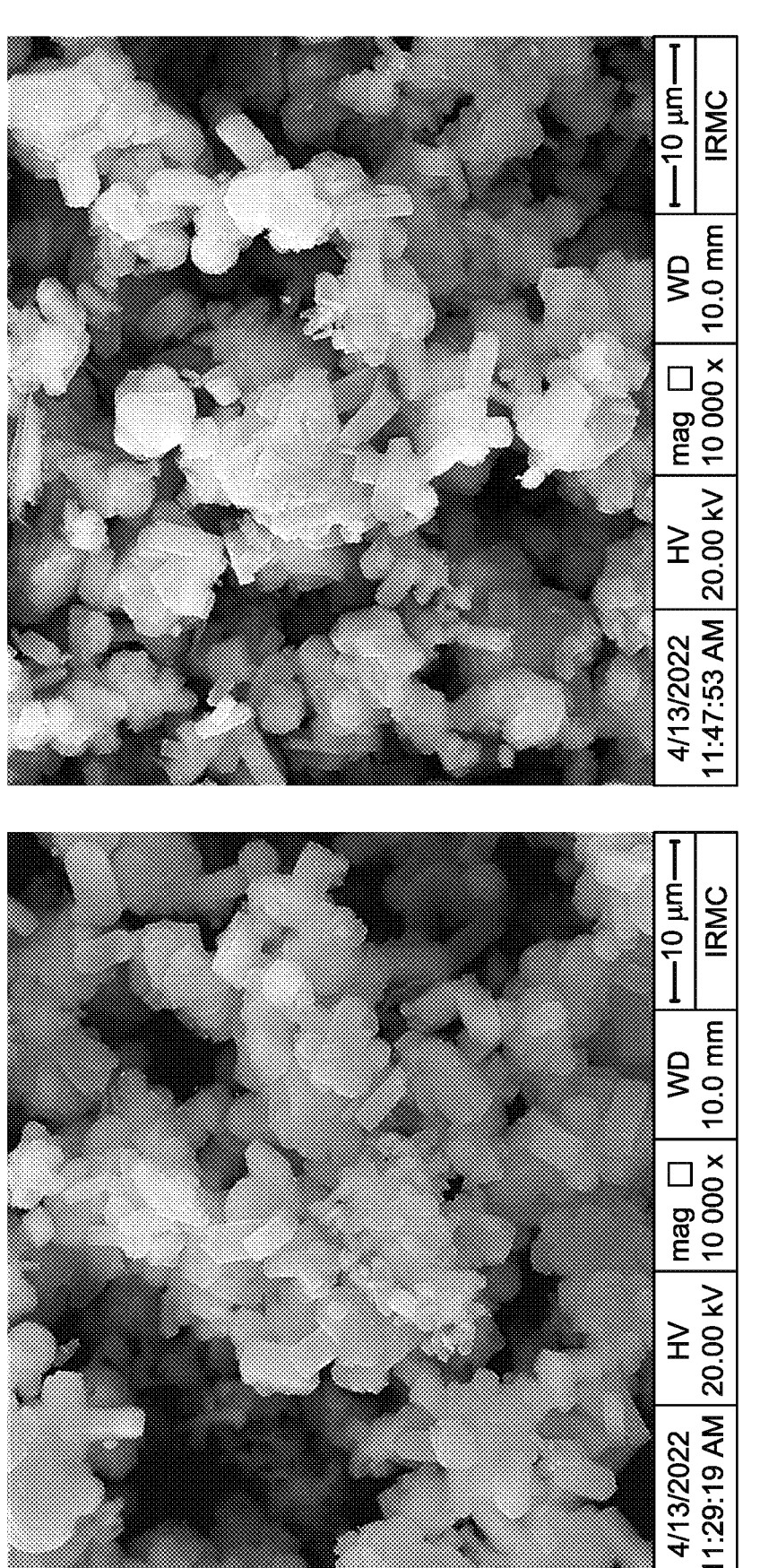
FIG. 8A shows scanning electron microscope (SEM) micrographs of the silver-silicalite before coating on the stainless-steel implant at a magnification of 10,000×, according to certain embodiments of the present disclosure.
Figure 9B:
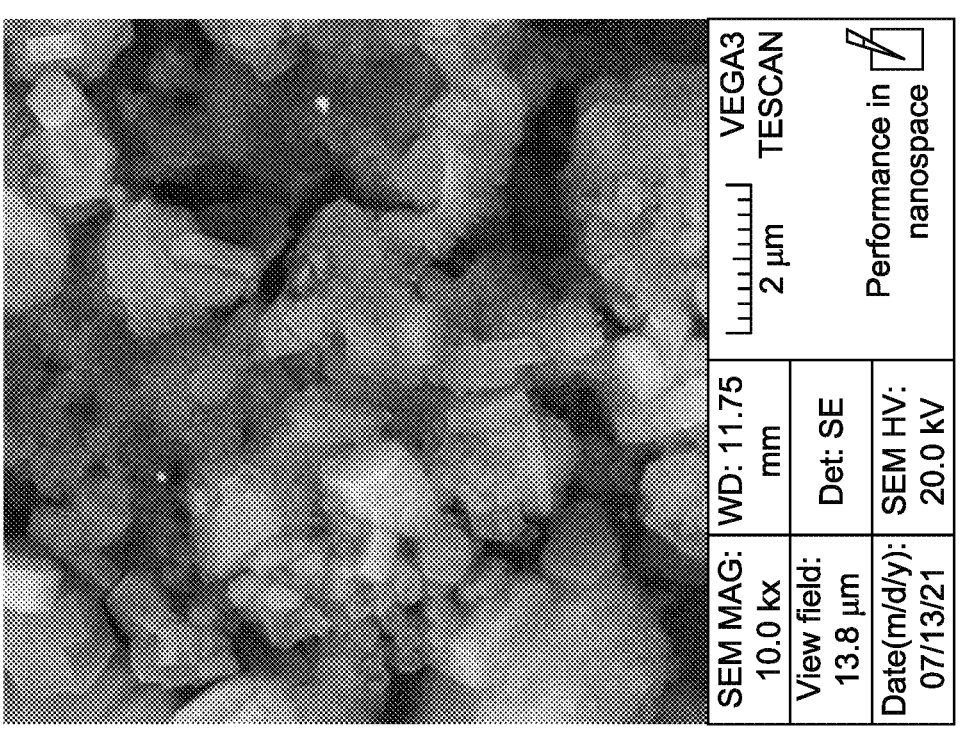
FIG. 9B shows a SEM micrograph of the silver-silicalite after coating on the stainless-steel implant at a magnification of 10,000×, according to certain embodiments of the present disclosure.
Figure 9A:
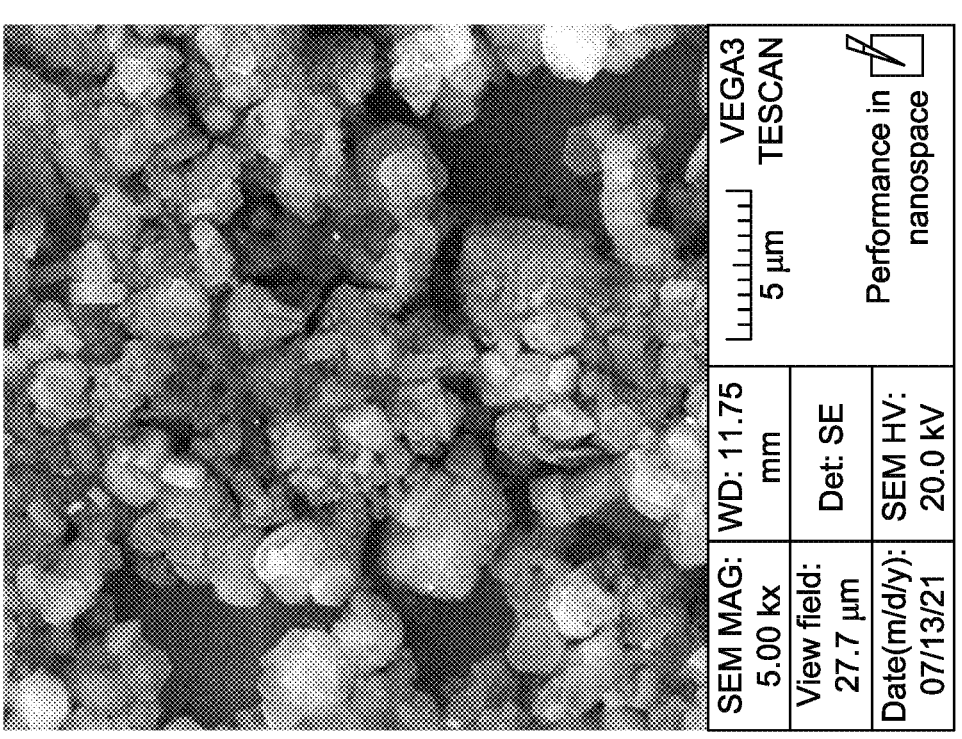
FIG. 9A shows a SEM micrograph of the silver-silicalite after coating on the stainless-steel implant at a magnification of 5,000×, according to certain embodiments of the present disclosure.
Figure 10:
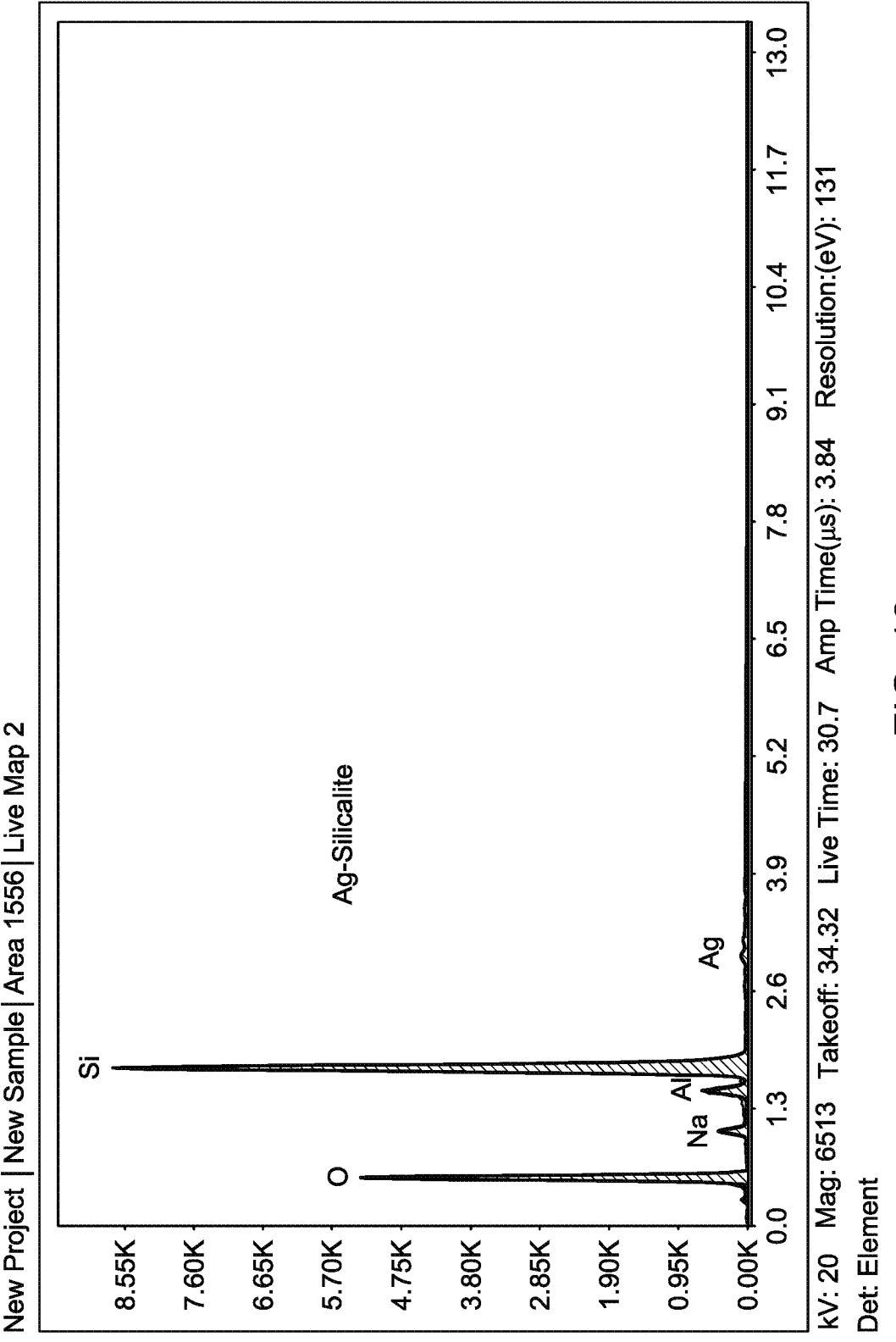
FIG. 10 is a spectrum depicting elemental composition and elemental mapping of the silver-silicalite before coating on the stainless-steel implant, according to certain embodiments of the present disclosure.
Figure 10:
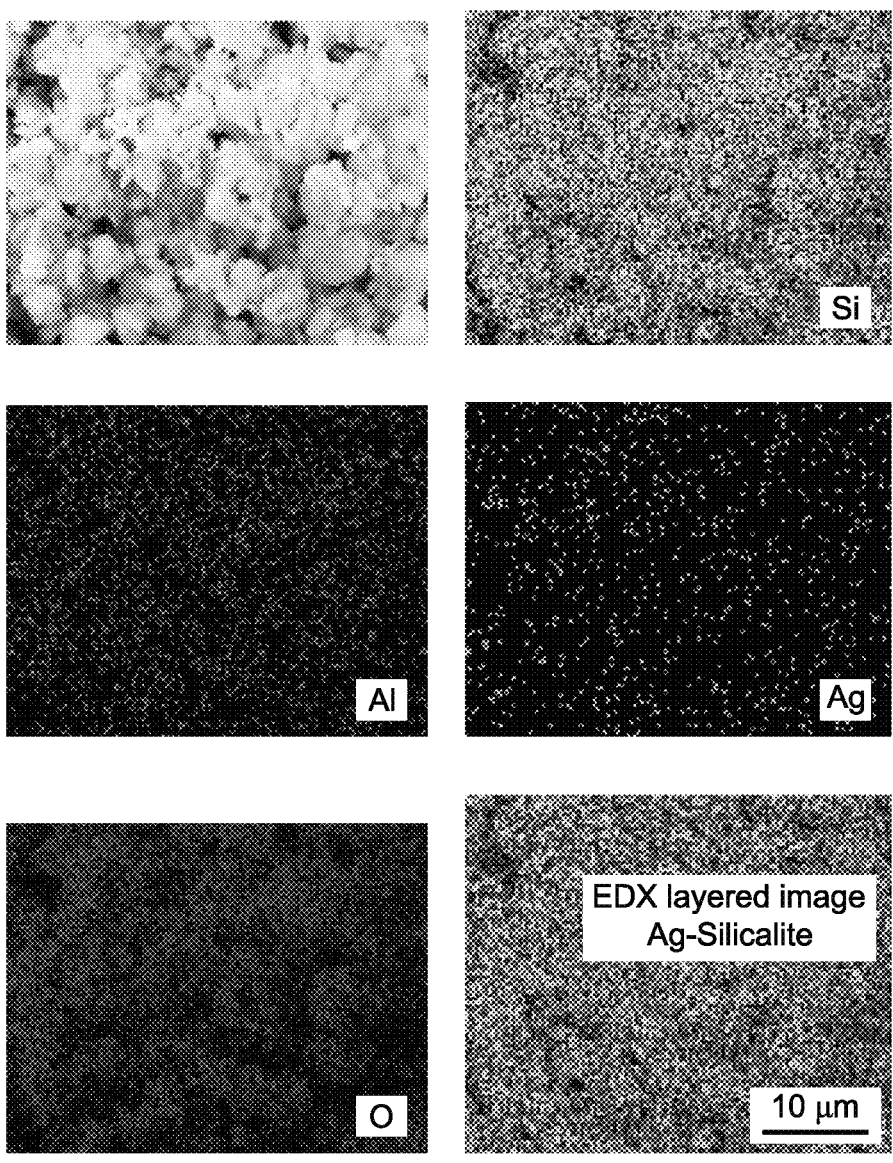
Figure 11:
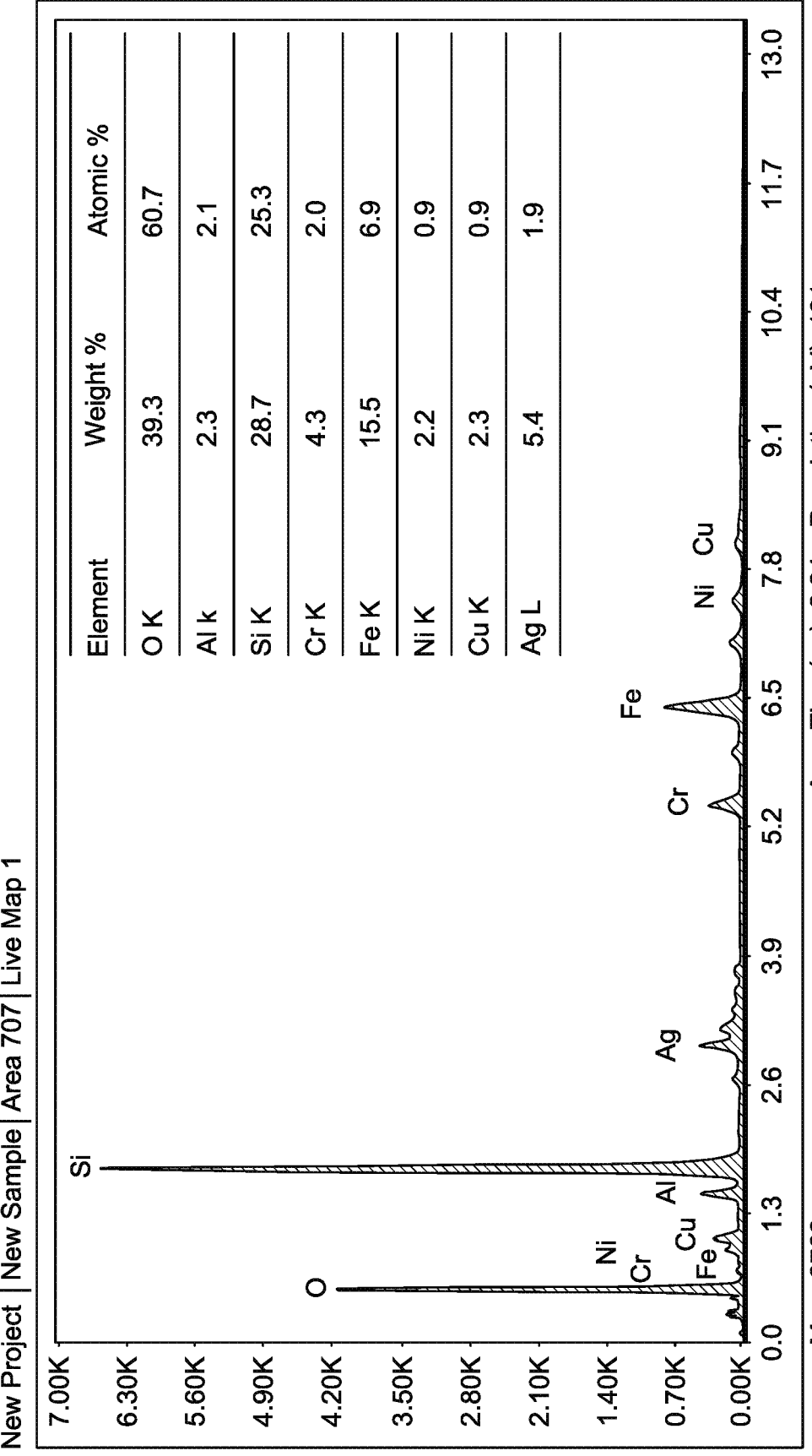
FIG. 11 is a spectrum showing elemental composition and elemental mapping of the silver-silicalite after coating on the stainless-steel implant, according to certain embodiments of the present disclosure.
Figure 11:
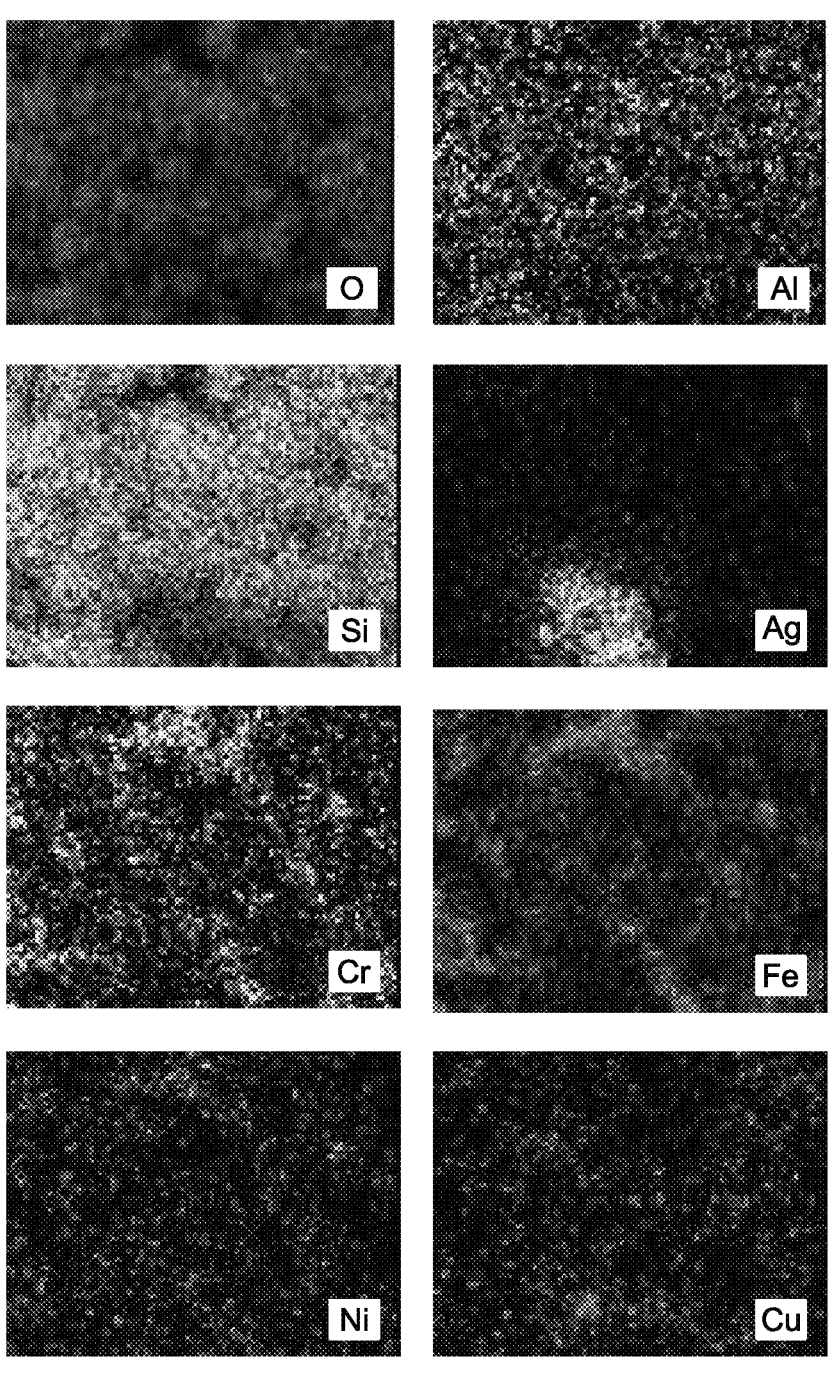
Figure 12:
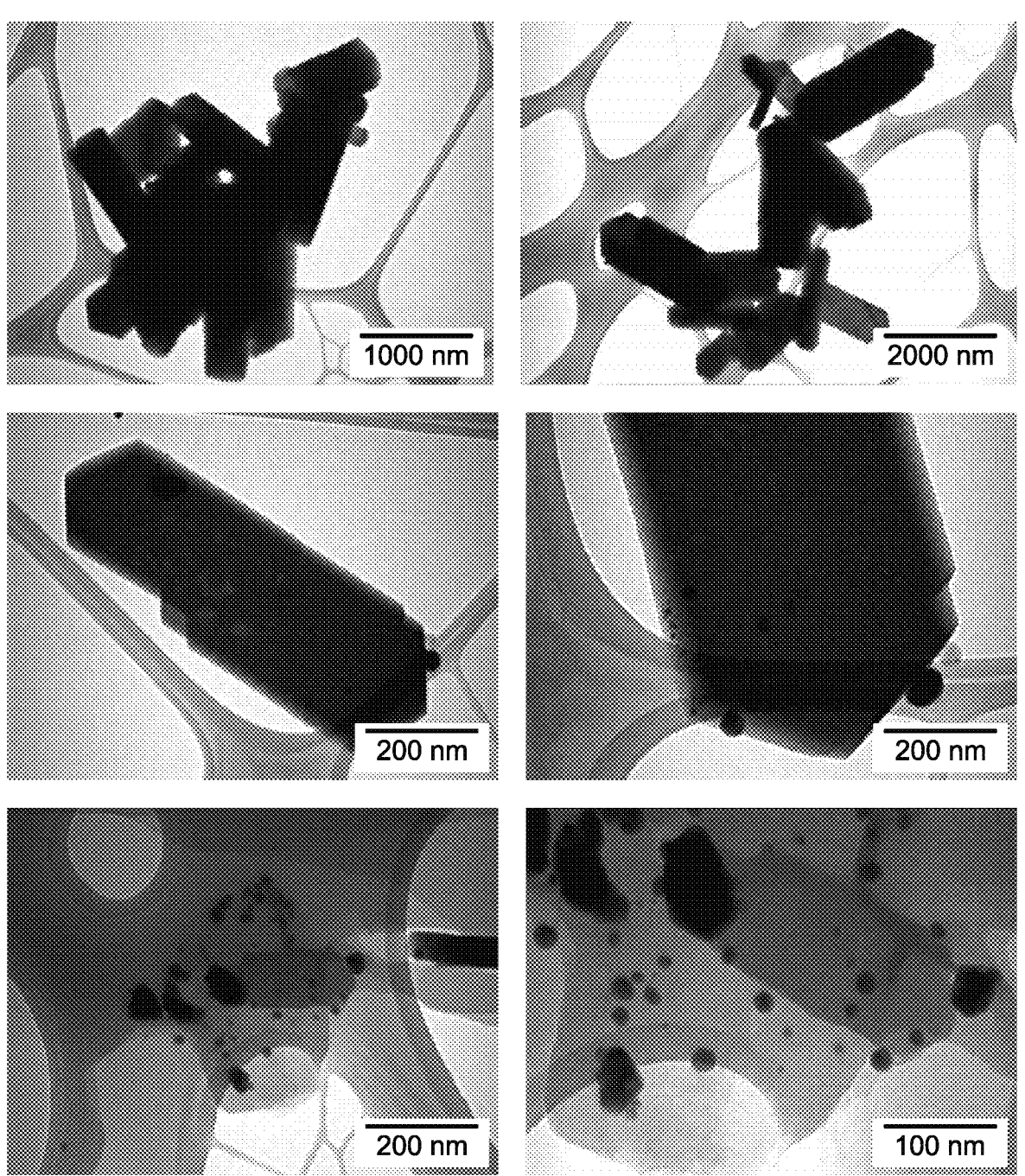
FIG. 12 shows transmission electron microscopy (TEM) images of the silver-silicalite before coating on the stainless-steel implant, according to certain embodiments of the present disclosure.
Figures 13A, 13B, 13C:
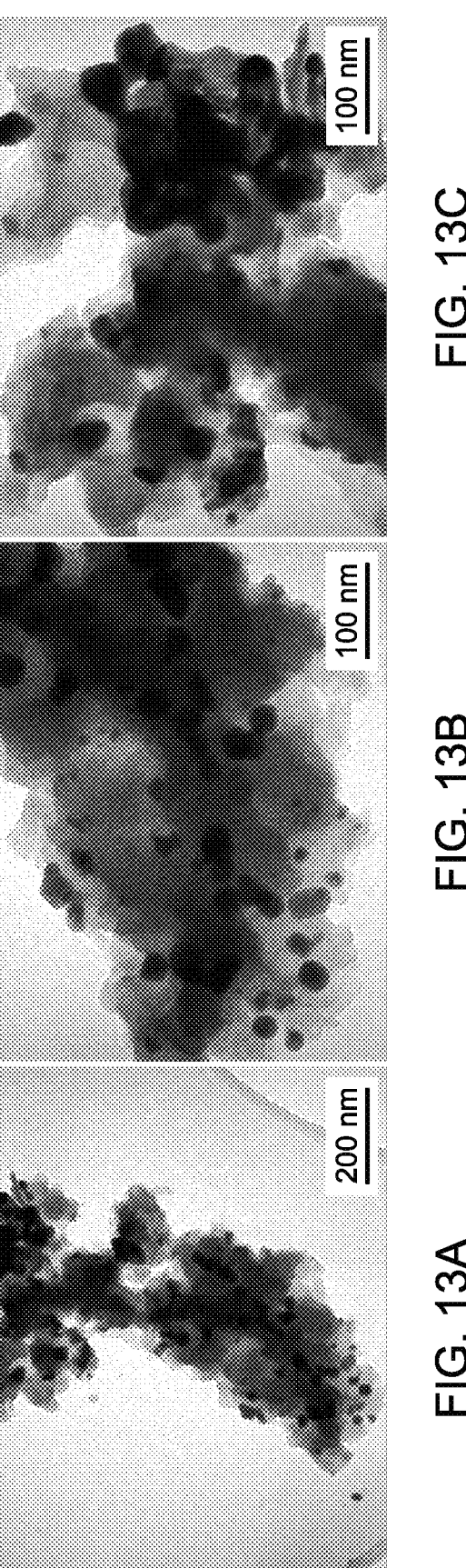
FIG. 13A shows a TEM image of the silver-silicalite at a magnification of 200 nanometers (nm), according to certain embodiments of the present disclosure.
FIGS. 13B-13C show TEM images of the silver-silicalite at a magnification of 100 nm, according to certain embodiments of the present disclosure.
Figures 14A, 14B, 14C, 14D, 14E, 14F:
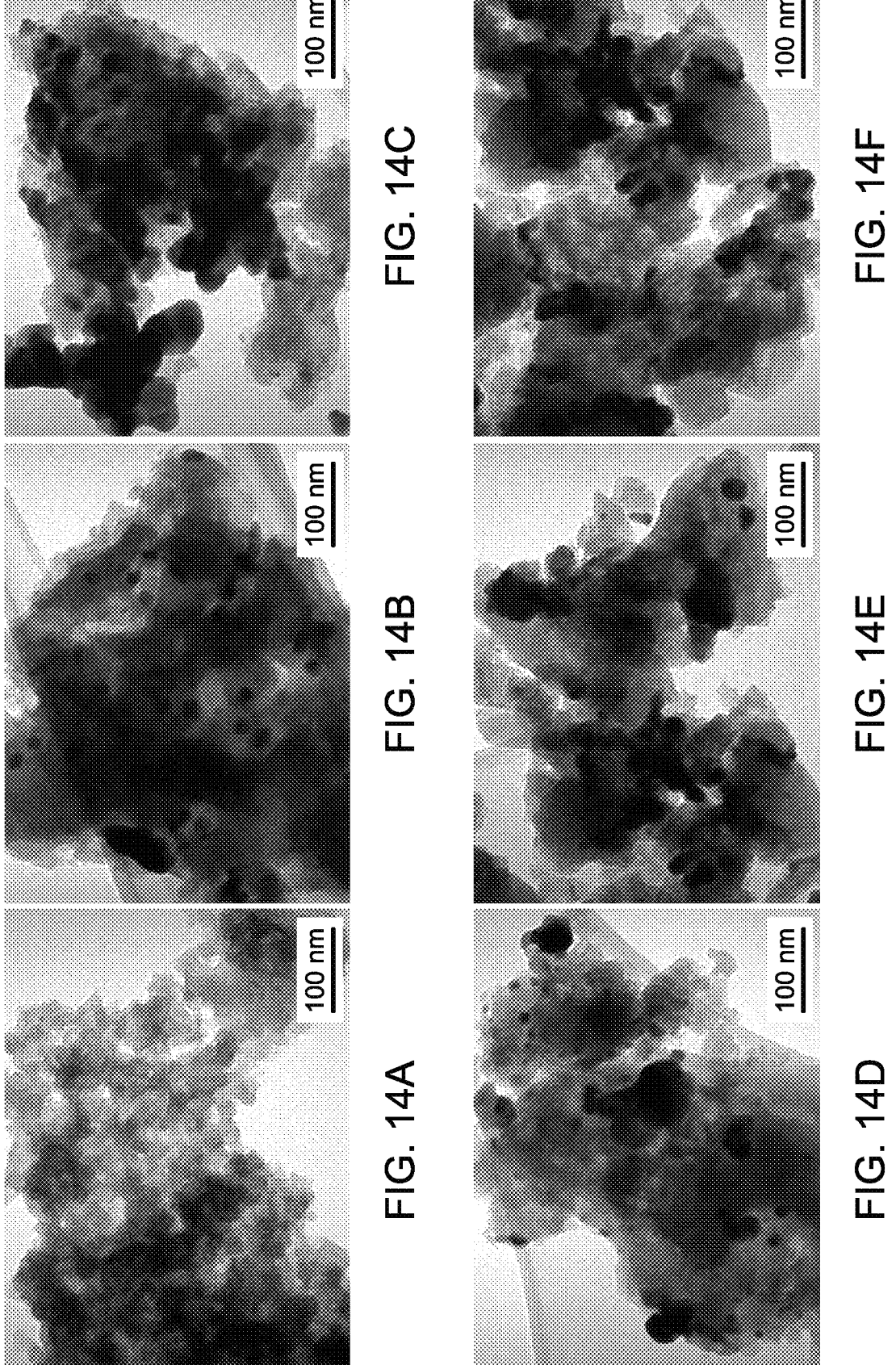
FIGS. 14A-14F show TEM images of the silver-silicalite at different areas, according to certain embodiments of the present disclosure.

FIGS. 8A and 8B show SEM images of silver-silicalite before coating at two different magnifications 10,000× and 20,000×, respectively. Template-free silver-silicalite was synthesized using the hydrothermal technique. The surface morphology of the silver-silicalite shows the presence of regular shaped ZSM-5 crystals. FIGS. 9A and 9B show SEM micrographs of the silver-silicalite after coating on the implant at two magnifications (5,000× and 10,000×), respectively. The presence of the silver-silicalite crystals on the implant confirms the presence of the coating on the implant. Elemental compositions and elemental mappings of the silver-silicalite before and after coating on the implant are shown in FIGS. 10-11 which confirm the presence of the silver-silicalite on the implant with essential elements such as O, Si, Al, Ag, Cr, Ni of both the silver-silicalite and the implant.

FIGS. 12-14F show TEM images of the silver-silicalite before coating on the implant clearly showing the rhombohedral and/or coffin shaped ZSM-5 shaped crystals, TEM images of the silver-silicalite at different magnifications such as at 10,000× and 20,000×, showing the Ag nanoparticles decorated in the MFI crystals and TEM images of the silver-silicalite at different areas, respectively.

Figure 15:
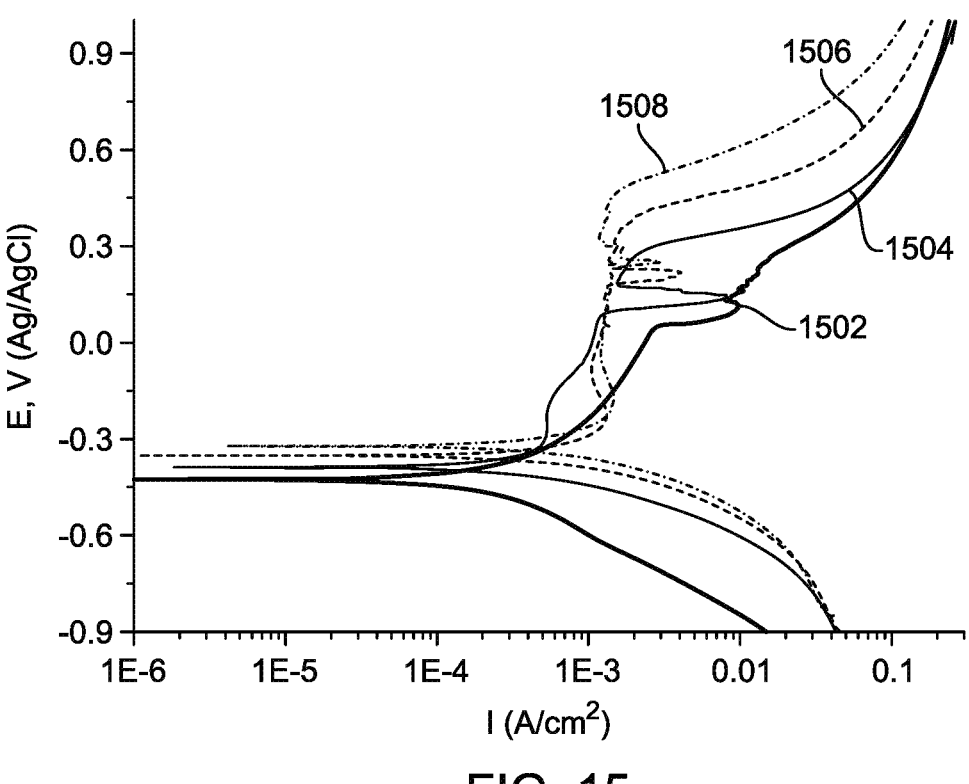
FIG. 15 is a graph depicting direct current (DC) polarization profile of bare steel in 1 molar (M) NaCl solution, according to certain embodiments of the present disclosure.

Potentiodynamic corrosion tests of bare steel and silver-silicalite coated AISI 316l stainless steel was performed by using a direct current (DC) polarization method at RT. FIG. 15 shows a DC polarization profile of bare steel sample before being coated with silver-silicalite obtained in 1 molar (M) NaCl (pH 1.0) on various days such as day 1 (1502), day 2 (1504), day 3 (1506), and day 5 (1508). A low corrosion current density of 0.014 A/cm$^2$ was observed on day 1 (1502) and a sudden increase was noticed up to 0.046 A/cm$^2$ on the subsequent days.

Figure 16:
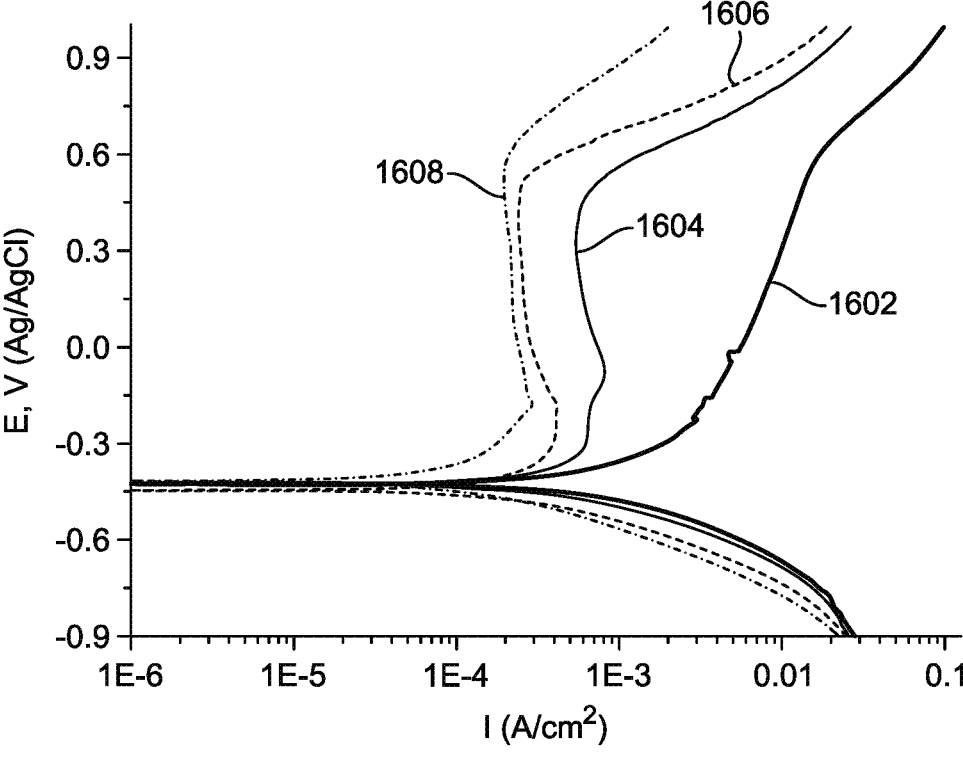
FIG. 16 is a graph depicting the DC polarization profile of the silver-silicalite coated on AISI 316l stainless steel in 1 M NaCl solution, according to certain embodiments of the present disclosure.

The corrosion studies of silver-silicalite coated AISI 316l stainless steel sample were performed under the same experimental conditions during the following days (day 1 (1602), day 2 (1604), day 3 (1606), and day 5 (1608)) of immersion in pH 1.0 NaCl solution (FIG. 16). The silver-silicalite coated on the stainless steel showed a gradual decrease in the corrosion current from 0.03 A/cm$^2$ to 0.021 A/cm$^2$ over the time. This indicates the stability of the coating-substrate and creates stable interface formation which contributes to the corrosion resistivity of the implant.

The nanomaterial Ag silicalite (ND-389) was tested against the *C. albicans* bacterium and showed an effective inhibition when studied for the cell forming units (cfu) after 24 hrs of incubation. The results show the number of cells less when a substrate was coated when compared to a control (untreated substate). However, the increase in concentration showed the better efficacy.

TABLE 1

Anti-*Candida* activity of the silver-silicalite coated implant.

| | ND-389 (mg/ml) | cfu |
|---|---|---|
| Control | | 254 |
| A | 8 | 53 |
| B | 4 | 48 |

TABLE 1-continued

Anti-*Candida* activity of the silver-silicalite coated implant.

| | ND-389 (mg/ml) | cfu |
|---|---|---|
| C | 2 | 97 |
| D | 1 | 129 |
| E | 0.5 | 110 |

The present disclosure provides silver-based zeolite silicalite coatings that are highly porous and biocompatible with tunable metal compositions for implant coating applications. The silver-silicalite coating possesses improved modulus matching and enhanced osteointegration. Corrosion resistant nature of the silver-silicalite coating enhances the life of the implant and avoids loosening. An implant coated with the silver-silicalite coating provides a stable interface formation which contributes corrosion resistivity of the implant. Furthermore, the implant coated with the silver-silicalite coating exhibits anti-*Candida* activity. The raw materials used to prepare the silver-silicalite coating are cheap and readily available, thereby making the entire process economically viable.

Numerous modifications and variations of the present disclosure are possible in light of the above teachings. It is therefore to be understood that within the scope of the appended claims, the invention may be practiced otherwise than as specifically described herein.

The invention claimed is:

1. A method for making a coated stainless steel implant, comprising:
    mixing metakaolin with an aqueous solution of NaOH to form a first mixture;
    mixing silica gel and silver nitrate with the first mixture to form a second mixture;
    mixing ZSM-5 zeolite with the second mixture to form a third mixture; and
    hydrothermally treating a stainless-steel substrate with the third mixture to form a silver-silicalite coating on the surface of the stainless-steel substrate thereby forming the coated stainless steel implant,
    wherein the hydrothermal treatment includes suspending the stainless-steel substrate in the third mixture by a wire, heating the stainless-steel substrate in the third mixture at a temperature range of 120 to 220° C. and sequentially pressuring to a pressure of up to 5 MPa and depressuring to ambient pressure,
    wherein the silver-silicalite coating comprises rhombohedral cuboidal particles having an average length of 2 to 5 μm, an average width of 1 to 2 μm and an average height of 0.5 to 2 μm,
    wherein the hydrothermal treatment is carried out in the absence of an organic template.

2. The method of claim 1, wherein the pressuring and depressuring is carried out for at least 5 cycles.

3. The method of claim 1, wherein the silver-silicalite coating has a SiO$_2$:Ag molar ratio of 25:1 to 100:1,
    the silver-silicalite coating is in direct and continuous contact with substantially the entire exposed outside surface of the substrate, and
    silver particles are formed at an outer surface of the silver-silicalite coating and substantially no silver particles are in contact with the surface of the substrate.

4. The method of claim 1, wherein the silver-silicalite coating has a SiO$_2$:Al$_2$O$_3$ molar ratio of 30:1 to 100:1.

5. The method of claim 1, wherein the silver-silicalite coating has a $SiO_2:Al_2O_3$ molar ratio of 50:1 to 80:1.

6. The method of claim 1, wherein the hydrothermal treatment is carried out at a temperature range of 160 to 190° C. for 40 to 50 hours.

7. The method of claim 1, wherein the silver-silicalite coating comprises silver nanoparticles having an average particle diameter of 10-200 nm.

8. The method of claim 7, wherein the silver-silicalite coating further comprises rhombohedral crystals of the ZSM-5 zeolite decorated with the silver nanoparticles.

9. The method of claim 7, wherein the silver-silicalite coating further comprises hexagonal lattice crystals of the ZSM-5 zeolite decorated with the silver nanoparticles.

10. The method of claim 1, wherein the silver-silicalite coating comprises 35 to 45 wt. % 0, 0.5 to 5 wt. % Al, 20 to 35 wt. % Si, 1 to 8 wt. % Cr, 10 to 25 wt. % Fe, 0.5 to 5 wt. % Ni, 0.5 to 5 wt. % Cu, and 1 to 10 wt. % Ag, wherein wt. % is based on a total weight of the silver-silicalite coating.

11. The method of claim 1, wherein the silver-silicalite coating is at least partially enfolded by a polymer.

12. The method of claim 11, wherein the polymer is at least one selected from the group consisting of a polyethylene glycol, a poly (ethylenimine), a poly (N-isopropyl acrylamide), a poly (2-hydroxyethyl methacrylate), a dendritic polymer, a polysaccharide, a poly (glycolic acid), and a poly (lactic acid).

13. The method of claim 12, wherein the polymer is a polyethylene glycol.

14. The method of claim 1, wherein the silver-silicalite coating further comprises coffin-shaped particles having an average length in a range of 2 to 5 μm, an average width in a range of 0.5 to 2 μm, and an average height in a range of 0.5 to 2 μm, the coffin-shaped particles form agglomerates having an average diameter in a range of 4 to 10 μm.

15. The method of claim 1, wherein the silver-silicalite coating is porous with a pore volume of 0.1 to 0.4 $cm^3/g$.

16. The method of claim 1, wherein the silver-silicalite coating is porous with a pore size distribution of 1 to 5 nm.

* * * * *